(12) United States Patent
Tsang

(10) Patent No.: US 10,269,098 B2
(45) Date of Patent: Apr. 23, 2019

(54) SYSTEMS AND METHODS FOR REMOVING HAZE IN DIGITAL PHOTOS

(71) Applicant: Chun Ming Tsang, Hong Kong (HK)

(72) Inventor: Chun Ming Tsang, Hong Kong (HK)

( * ) Notice: Subject to any disclaimer, the term of this patent is extended or adjusted under 35 U.S.C. 154(b) by 0 days.

(21) Appl. No.: 15/340,405

(22) Filed: Nov. 1, 2016

(65) Prior Publication Data

US 2018/0122049 A1    May 3, 2018

(51) Int. Cl.
*G06T 5/00* (2006.01)
*G06T 7/254* (2017.01)
*G06T 5/10* (2006.01)

(52) U.S. Cl.
CPC .............. *G06T 5/002* (2013.01); *G06T 5/10* (2013.01); *G06T 7/254* (2017.01); *G06T 2207/10024* (2013.01); *G06T 2207/20056* (2013.01)

(58) Field of Classification Search
CPC ......... G06T 5/005; G06T 5/002; G06T 5/008; G06T 2207/20192; G06T 2207/20182; G06T 2207/20172
USPC ....................................................... 382/275
See application file for complete search history.

(56) References Cited

U.S. PATENT DOCUMENTS

| | | | | |
|---|---|---|---|---|
| 9,478,015 B2 * | 10/2016 | Tan | ............ | G06T 5/003 |
| 2008/0278587 A1 * | 11/2008 | Izawa | ............ | G02B 7/36 |
| | | | | 348/207.11 |
| 2011/0135200 A1 * | 6/2011 | Chen | ............ | G06T 5/003 |
| | | | | 382/167 |
| 2012/0213436 A1 * | 8/2012 | Grindstaff | ............ | G06T 5/008 |
| | | | | 382/167 |
| 2014/0079288 A1 * | 3/2014 | Lee | ............ | G06T 5/00 |
| | | | | 382/106 |
| 2014/0140619 A1 * | 5/2014 | Mukhopadhyay | ........ | G06T 5/40 |
| | | | | 382/167 |
| 2014/0247968 A1 * | 9/2014 | Pavlic | ............ | G06K 9/00791 |
| | | | | 382/104 |
| 2015/0063719 A1 * | 3/2015 | Park | ............ | G06T 5/008 |
| | | | | 382/274 |

(Continued)

FOREIGN PATENT DOCUMENTS

CN           103077500 A   *   5/2013

OTHER PUBLICATIONS

Zhang, Jing-lei, Bin Gao, and Xiu-ping Gu. "Traffic images enhancement based on vanishing point detection and atmospheric scattering model." Image and Signal Processing (CISP), 2010 3rd International Congress on. vol. 2. IEEE, 2010.*

(Continued)

*Primary Examiner* — Jonathan S Lee

(57) ABSTRACT

According to embodiments of the invention, systems and methods are provided for computer-implemented removal of haze, fog, cloudiness and/or other undesired noise from digital imagery. The disclosed technology may be carried out automatically or semi-autonomously, with input from a user. Systems and methods generally involve detecting and isolating certain portions, regions, and/or objects found in a digital image. Depending on their detected depth of field and/or other parameters, certain changes are selectively implemented to reduce the appearance of the detected haze, fog, cloudiness and/or other undesired noise. User input may be employed to further improve certain characteristics of the digital image.

12 Claims, 8 Drawing Sheets

(56) References Cited

U.S. PATENT DOCUMENTS

| | | | |
|---|---|---|---|
| 2015/0071563 A1* | 3/2015 | Park | G06T 5/007 382/274 |
| 2015/0161769 A1* | 6/2015 | Hong | G06K 9/4661 382/274 |
| 2017/0126957 A1* | 5/2017 | Uchida | G02B 7/28 |

OTHER PUBLICATIONS

Lagorio, Andrea, Enrico Grosso, and Massimo Tistarelli. "Automatic detection of adverse weather conditions in traffic scenes." Advanced Video and Signal Based Surveillance, 2008. AVSS'08. IEEE Fifth International Conference on. IEEE, 2008.*

* cited by examiner

SYSTEMS AND METHODS FOR REMOVING HAZE IN DIGITAL PHOTOS

FIELD OF THE INVENTION

The invention relates generally to digital image processing, and more specifically, to removing haze based on human visual response by means of constraints.

BACKGROUND OF THE INVENTION

When a photograph is taken by a camera, an image is collected by a lens and retained in some medium. The image is generally produced by the light captured by the lens for the brief duration during which the shutter of the camera is open.

When images are captured outdoors, haze tends to adversely impact the quality of the background. More specifically, weather and other atmospheric phenomena, such as haze, greatly reduce the visibility of distant regions in images of outdoor scenes. Such haze is generated when light is refracted or obstructed by moisture particles and other particulate matter residing in the atmosphere.

Manipulating a digital image to remove the effect of haze, often termed "dehazing", is a challenge for photography experts. Images of outdoor scenes are usually degraded by atmospheric particles, such as haze, fog and smoke, which fade the color and reduce the contrast of objects in the scene. The irradiance received by the camera from the scene point is attenuated along the line of sight. Furthermore, the incoming light is blended with the ambient light reflected into the line of sight by atmospheric particles. Poor visibility becomes a major problem for outdoor video surveillance applications.

Haze removal techniques are commonly employed by photographers. Typically, haze removal is usually done across the entire image. This creates a problem when an image has a narrowed depth of field, in which the subjects on the foreground usually have a sharper focus than those on the background. When haze removal applies, all subjects would typically be applied uniformly, without accounting for the blurred background.

As such, there exists a need for a haze removal method and system for selectively applying haze removal techniques to portions of a digital image which are most afflicted.

SUMMARY OF THE INVENTION

According to embodiments of the invention, systems and methods are provided for computer-implemented removal of haze, fog, cloudiness and/or other undesired noise from digital imagery. The disclosed technology may be carried out automatically or semi-autonomously with input from a user. Systems and methods generally involve detecting and isolating certain portions, regions, and/or objects found in a digital image. Depending on their detected depth of field and/or other parameters, certain changes are selectively implemented to reduce the appearance of the detected haze, fog, cloudiness and/or other undesired noise. User input may be employed to further improve certain characteristics of the digital image. The disclosed technology may be carried out using an computing device, such as a mobile phone or notebook computer. The method may be carried out by a processor and computer readable storage medium. Software adapted to be used on a given computing device may be the platform from which the image de-hazing is carried out.

The digital image may be that taken by a digital camera or any other optical device. The method may be carried out, not necessarily in the following order, by: a) detecting the presence of haze in an image; b) detecting that a background of the image has a narrow depth of field; c) extracting a foreground portion from the image; d) extracting a background portion of the image; and/or e) performing image processing on the extracted foreground portion.

The aforementioned step of detecting the presence of haze in an image may be carried out using a Fourier analysis of RGB channels of the image. The detection of the narrow depth of field background may be achieved by referencing specific parameters and/or characteristics of the image. The parameters may be, but are not limited to, aperture, zoom level, and shutter speed. The extraction and/or removal of the foreground portion from the image is carried out via an edge map and an edge detection mechanism. The processing of the foreground portion may be conducted via an image sharpening technique such that the haze of the foreground portion is removed or dampened, while the background portion of the image remains unchanged.

In another embodiment of the disclosed technology, alternative methods are provided for computer-implemented digital image de-hazing. The digital image may be that taken by a digital camera or any other optical device. The method may be carried out, not necessarily in the following order, by: a) detecting the presence of haze in an image; b) extracting at least one foreground object from the image; c) extracting a background portion of the image; d) displaying the at least one foreground object and the background portion to a user, each associated with a value indicating depth of field of the foreground object and a value indicating depth of field of the background portion; e) receiving input from the user to vary the value indicating depth of field of the background portion; and/or f) performing image processing on the foreground object and the background object in view of the varied value indicating depth of field of the background portion.

In a further embodiment of the disclosed method, command may be receivable by the user to increase the value indicating depth of field. Similarly, a different command may be receivable by the user to decrease the value indicating depth of field. Still further, a second foreground object may be extracted from the image, the object having a value indicating a different depth of field than the first foreground object.

In another embodiment of the disclosed technology, a computer-implemented method is provided for digital image de-hazing. The method may be carried out, not necessarily in the following order, by: a) detecting the presence of haze in an image; b) extracting a first foreground object from the image, the first foreground object being associated with a first value indicating depth of field of the first foreground object; c) extracting a second foreground object from the image, the second foreground object associated with a second value indicating depth of field of the second foreground object; d) extracting a background portion of the image; e) displaying the first foreground object, the second foreground object, and the background portion, along with their respective depth of field values to a user; f) receiving an input from the user to vary the value indicating depth of field of the background portion; and/or g) performing image processing on the foreground object for de-hazing and on the background object in view of the varied value indicating depth of field of the background portion.

In a further embodiment, an input may be received by the user to vary the value indicating depth of field of the second foreground object. During image processing, the depth of field of the second foreground object may be changed in view of the varied value indicating the depth of field of the second foreground object.

A better understanding of the disclosed technology will be obtained from the following brief description of drawings illustrating exemplary embodiments of the disclosed technology.

A better understanding of the disclosed technology will be obtained from the following detailed description of embodiments of the disclosed technology, taken in conjunction with the drawings.

DETAILED DESCRIPTION

References will now be made in detail to the present exemplary embodiments, examples of which are illustrated in the accompanying drawings. Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness.

According to embodiments of the invention, systems and methods are provided for computer-implemented removal of haze, fog, cloudiness and/or other undesired noise from digital imagery. The disclosed technology may be carried out automatically or semi-autonomously with input from a user. Systems and methods generally involve detecting and isolating certain portions, regions, and/or objects found in a digital image. Depending on their detected depth of field and/or other parameters, certain changes are selectively implemented to reduce the appearance of the detected haze, fog, cloudiness and/or other undesired noise. User input may be employed to further improve certain characteristics of the digital image. The disclosed technology may be carried out using an computing device, such as a mobile phone or notebook computer. The method may be carried out by a processor and computer readable storage medium. Software adapted to be used on a given computing device may be the platform from which the image de-hazing is carried out.

Figure 1:
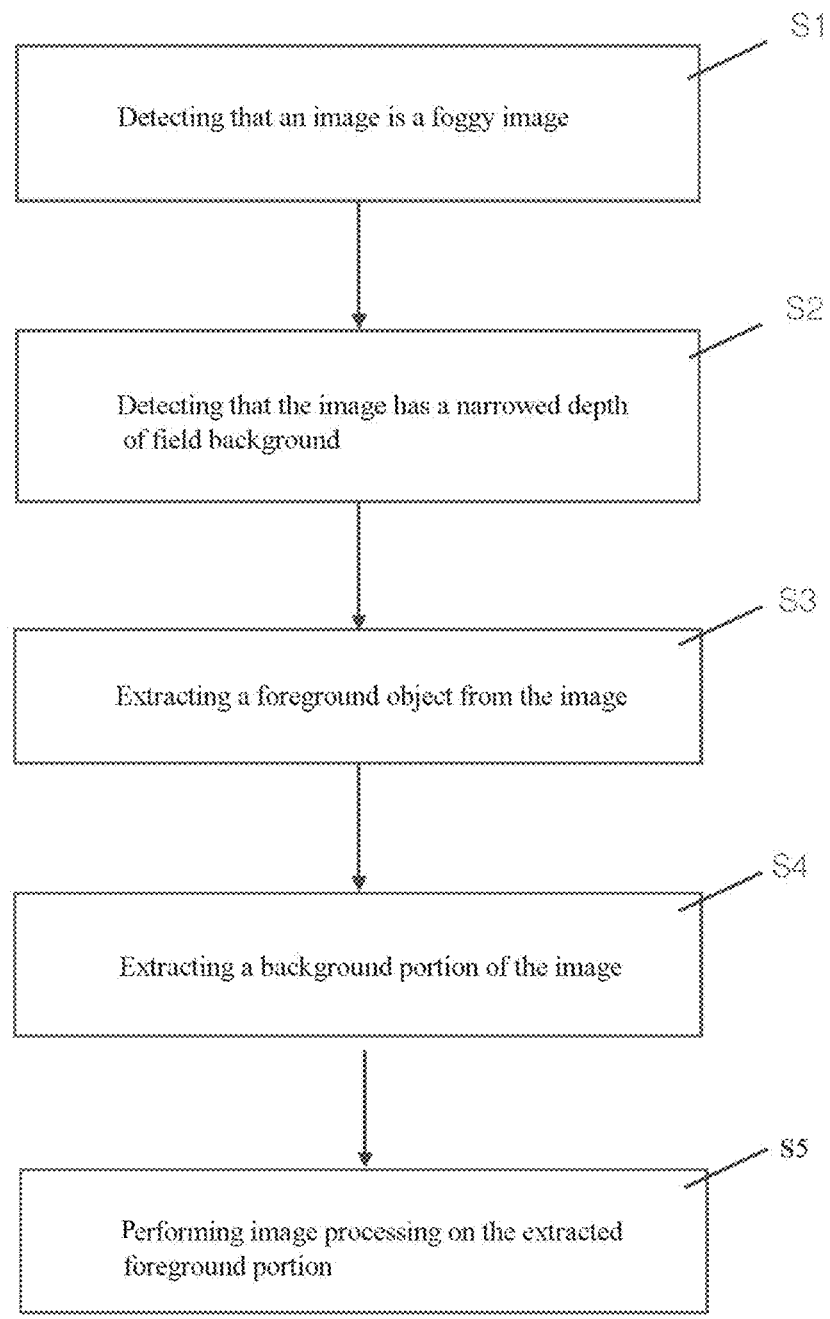
FIG. 1 shows a flow chart outlining steps of a method of removing haze according to embodiments of the disclosed technology.

Referring now to FIG. 1, a flow chart is depicted outlining steps of a method of removing haze according to embodiments of the disclosed technology. The first step, S1, involves the detection that the particular image has the presence of fog, haze, cloudiness, smog and/or other environmental noise. Such may be the case in photos taken under less-than-optimal weather conditions or photos taken in geographic locations with a high incidence of air pollution or smog. The image may be a digital image or photo. The image may be taken by a digital camera or any other optical device, such as, but not limited to, an optical scanner. The image may be computer readable. The image may have one or more of the following file extensions: JPEG/JFIF, JPEG 2000, Exif, TIFF, GIF, BMP, PNG, PPM, PGM, PBM, and PNM.

The detection of haze of step S1 done via Fourier analysis by measuring the pixels' luminous level in the processed image. The Fourier analysis is an important image processing tool which is used to decompose an image into its sine and cosine components. The output of the transformation represents the image in the Fourier or frequency domain, while the input image is the spatial domain equivalent. In the Fourier domain image, each point represents a particular frequency contained in the spatial domain image. The Fourier analysis is used in a wide range of applications, such as image analysis, image filtering, image reconstruction and image compression. The Fourier analysis may be taken with respected to the Red-Green-Blue (herein "RGB") channels of the image. Generally, an RGB image has three channels: red, green, and blue. RGB channels roughly follow the color receptors in the human eye, and are used in computer displays and image scanners.

Step S2 involves detection of the depth of field of the image. This can be done by a number of means, including referencing parameters of the image, including aperture, zoom level, and shutter speed. In this embodiment, if the image has a narrow depth of field, the method proceeds to step S3 whereby a foreground object is extracted from the image. This is performed via an analysis known as edge extraction. In such a process, an edge detection mechanism would be deployed to extract the background option from the foreground portion or subject. Next, in step S4, a background portion of the image is extracted. Finally, in step S5, image processing is performed with respected to the extracted foreground portion of the image. As such, the processing of the image is only carried out with respect to the extracted foreground portion or subject without affecting the background portion, so that the contrast between the foreground portion and the background portion can be further enhanced in the final processed, output image.

Figure 2:
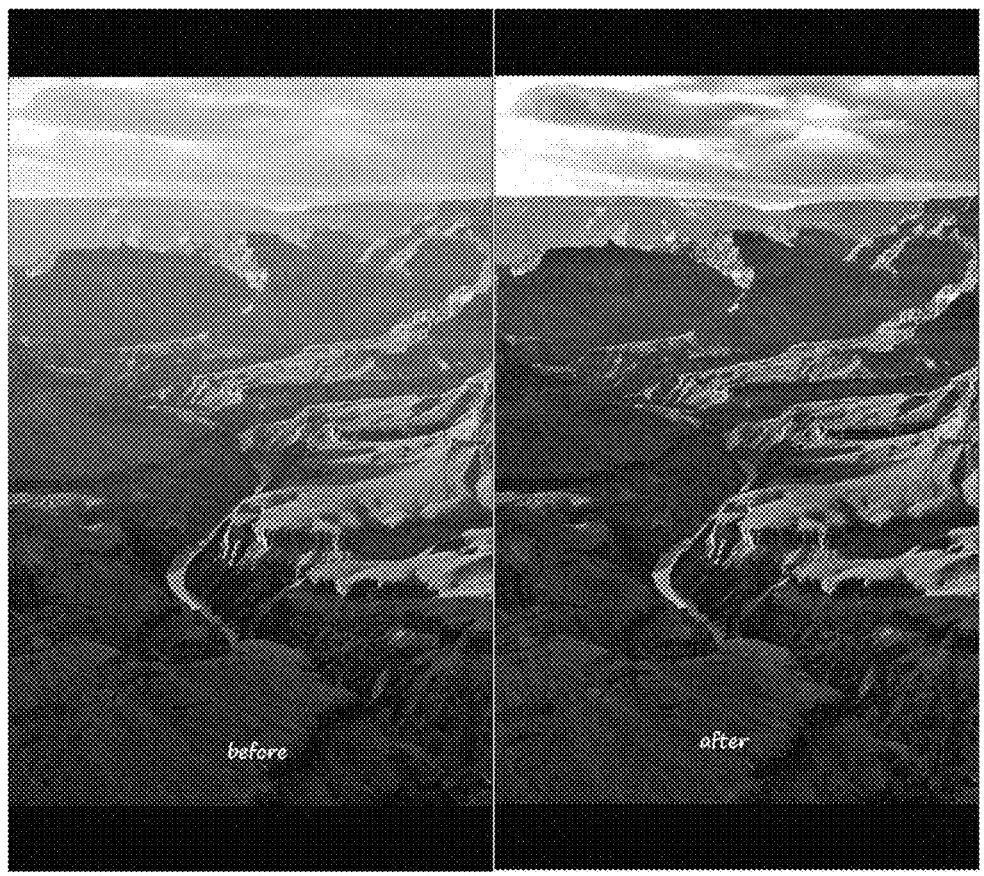
FIG. 2 shows an example of an image before and after the de-hazing method of the disclosed technology.

FIG. 2 shows an example of an image before and after the de-hazing method of the disclosed technology. FIG. 2 depicts the exemplary method of FIG. 1 having been carried out on an image. Visible in the "before" portion of FIG. 2 is the existence of throughout the image, particularly in the background. The "after" portion of FIG. 2 shows the foreground haze having been reduced or removed.

Figure 3:
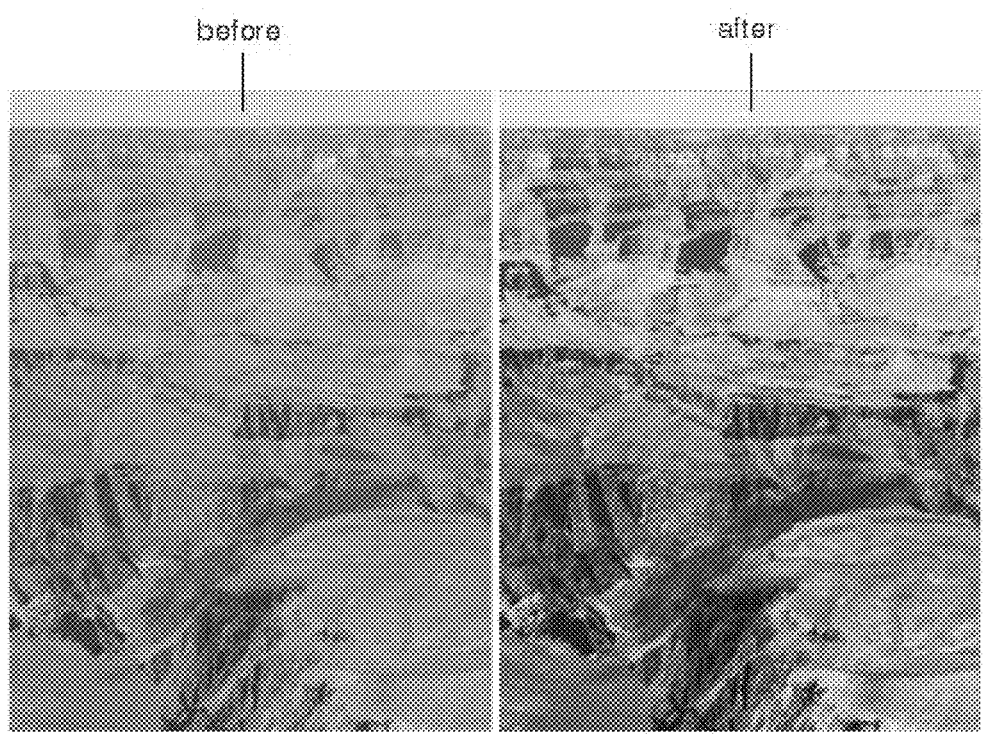
FIG. 3 shows another example of an image before and after the de-hazing method of the disclosed technology.

FIG. 3 shows another example of an image before and after the de-hazing method of the disclosed technology. In this example, distant portions of the landscape are noticeably sharpened and most of the haze is removed from the "before" portion of the image.

Figure 4:
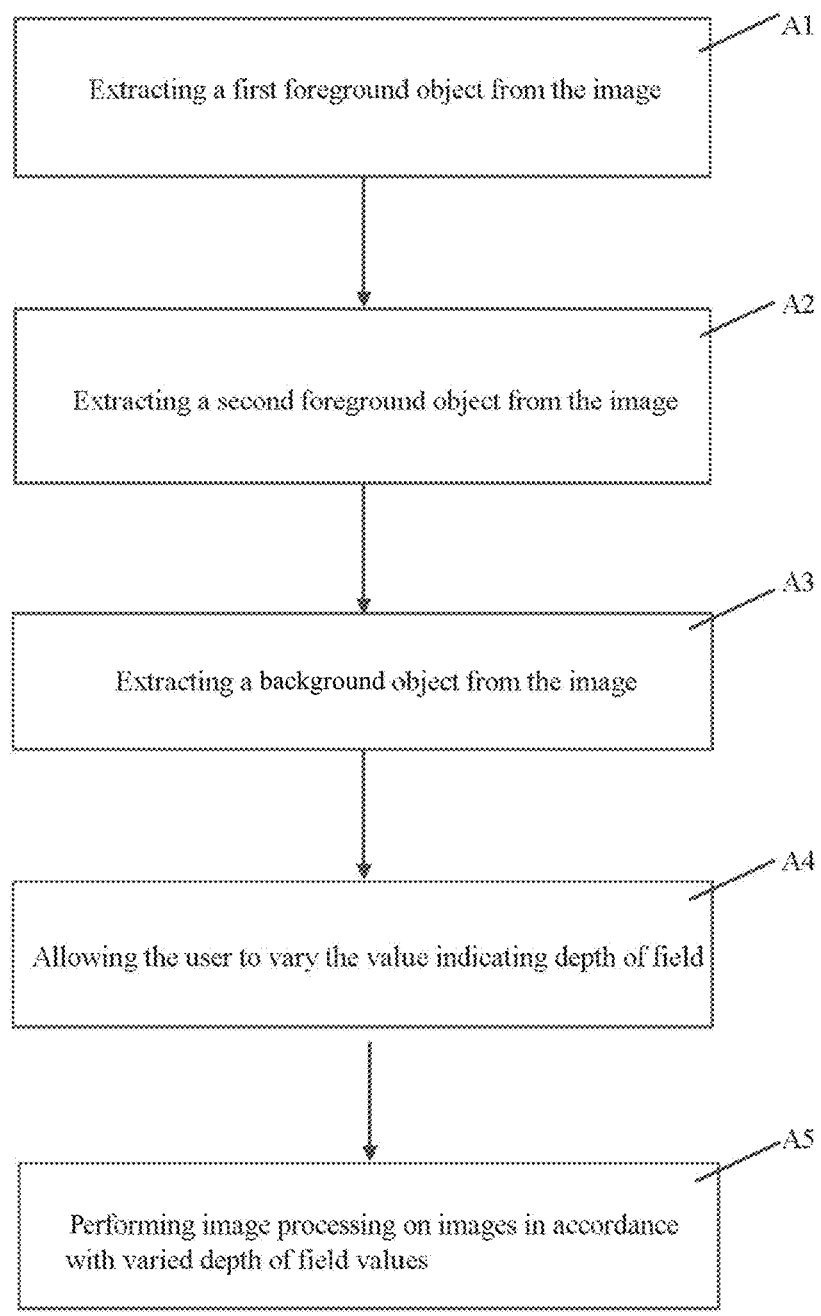
FIG. 4 shows a flow chart outlining steps of an alternative method of removing haze according to embodiments of the disclosed technology.

FIG. 4 shows a flow chart outlining steps of an alternative method of removing haze according to embodiments of the disclosed technology. In this alternative embodiment, after extracting both the foreground and the background subjects or portions, the image can be displayed to the user, showing the identified foreground object and the background portion, in which each object or option is associated with a value indicating depth of field of the foreground object and a value indicating depth of field of the background portion. As an additional feature, the user may be allowed to vary the depth of field values of either the foreground or background portions or objects such that during processing, the image is filtered to remove the haze of the image in proportion of the depth of field values.

The method begins with steps A1 and A2, whereby first and second foreground objects are respectively extracted from the image. Next, in step A3, a background object or portion is extracted from the image. In step A4, a user may alter a value respective of the depth of field of the image. The user input allows the image to be tweaked based on the particular preferences of the user. Next, in step A5, the image is processed in accordance with the changed depth of field values per the user's input.

Figure 5:
FIG. 5 shows an example of an image with a defined background portion and foreground portion according to embodiments of the disclose technology.
Figure 6:
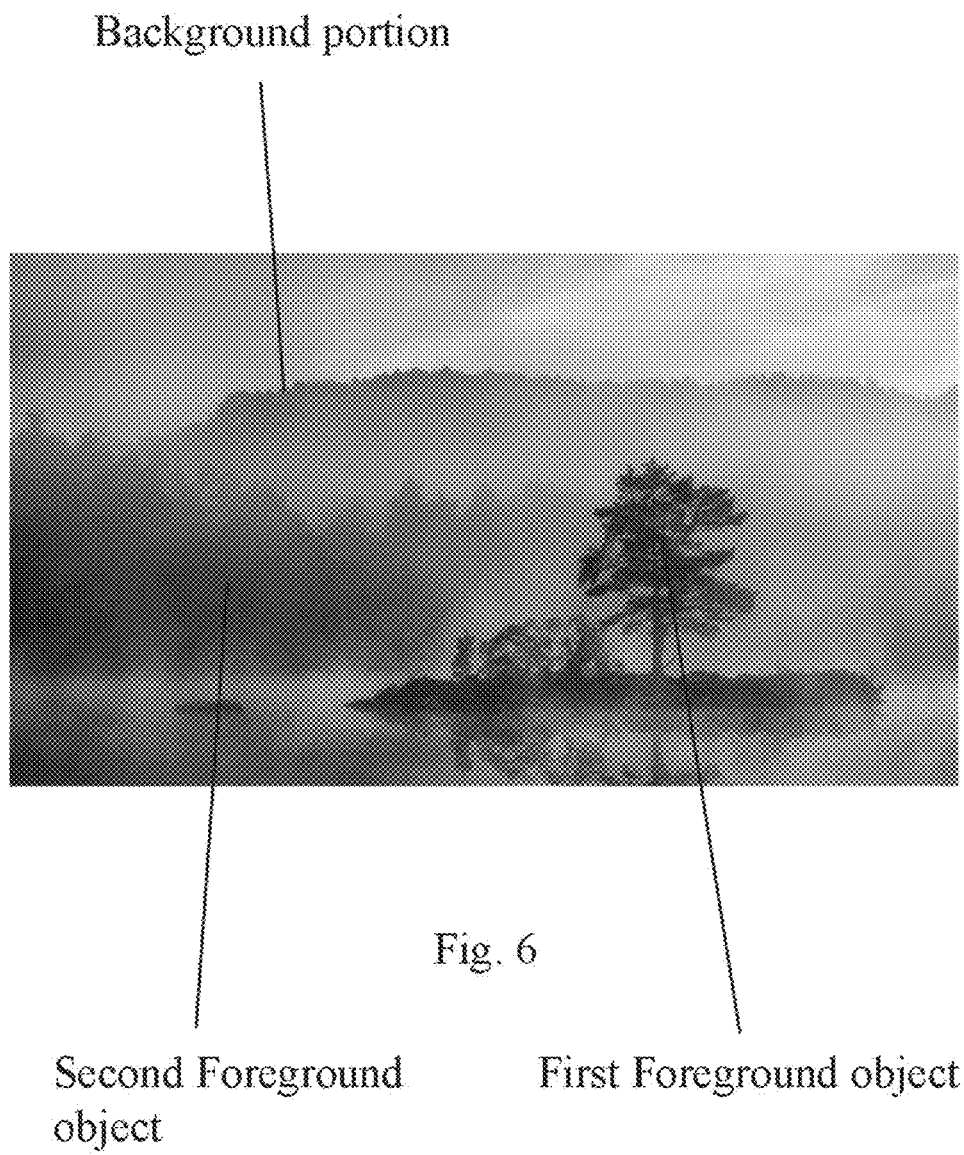
FIG. 6 shows an example of an image with a defined background portion and two defined foreground objects according to embodiments of the disclose technology.

FIG. 5 shows an example of an image with a defined background portion and foreground portion according to embodiments of the disclose technology. FIG. 6 shows an example of an image with a defined background portion and two defined foreground objects according to embodiments of the disclose technology. These images have a discernable depth of field as indicated by the steps of FIGS. 1 and 4. The first foreground object, in this example a tree, is seemingly the focus of this photograph and thus desired to be depicted in a clear manner. As such, it is desirable to have the haze removed from this particular portion of the photograph. Contrastingly, the haze surrounding the background of the image of FIG. 5 adds ambience and would likely be desired to be retained in the image. The example shown in FIG. 6 further isolates the background of the image, selecting the closest row of trees as the second foreground object. As such, this object is desired to be de-hazed along with the first foreground object.

Figure 7:
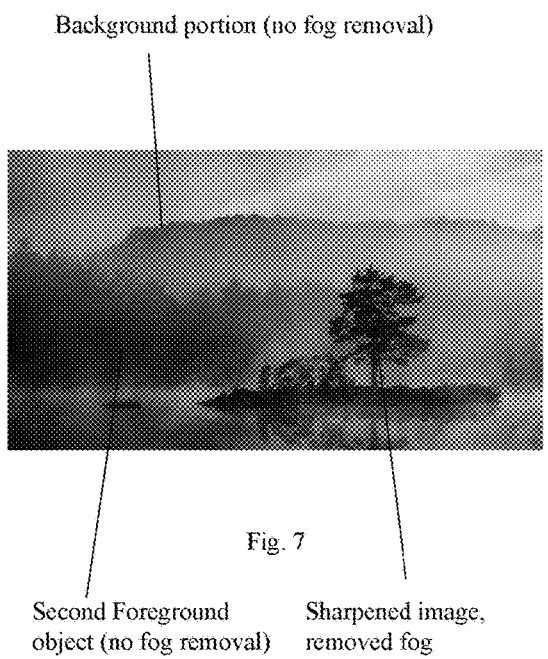
FIG. 7 shows the image of FIG. 6, with fog having been removed from the first foreground object according to embodiments of the disclosed technology.

FIG. 7 shows the image of FIG. 6, with fog having been removed from the first foreground object according to embodiments of the disclosed technology. In this example, the tree is clearly the focal point of the image, while the entire background remains enveloped in a haze.

Figure 8:
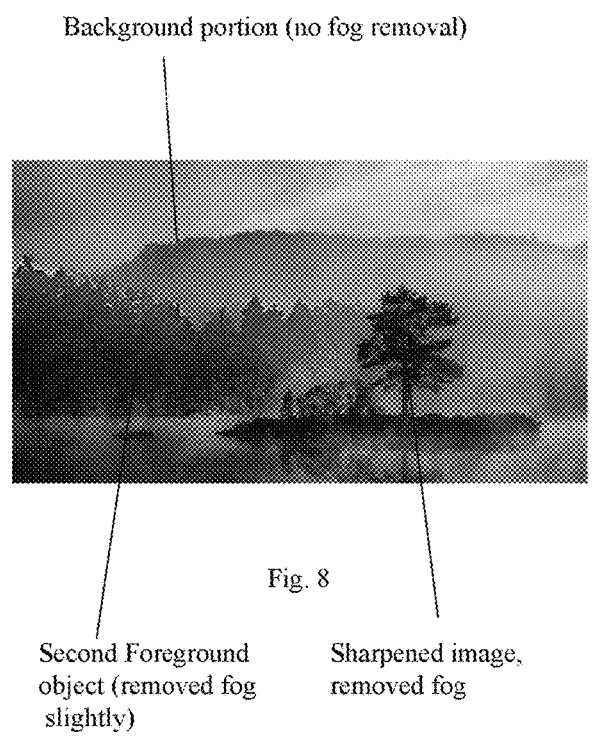
FIG. 8 shows the image of FIG. 6, with fog having been removed entirely from the first foreground object and partially from the second foreground object according to embodiments of the disclosed technology.

FIG. 8 shows the image of FIG. 6, with fog having been removed entirely from the first foreground object and partially from the second foreground object according to embodiments of the disclosed technology. In this example, the row of trees in the foreground is also desired to be a feature of the image. As such, the haze covering this second foreground object is somewhat reduced. However, the tree still remains the focal point of the image.

While the disclosed invention has been taught with specific reference to the above embodiments, a person having ordinary skill in the art will recognize that changes can be made in form and detail without departing from the spirit and the scope of the invention. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the invention.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex inter-chaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-levelprogramming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mutt," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand apply in a manner independent of a specific vendor's hardware implementation.

What is claimed:

1. A computer-implemented method for digital image de-hazing, the method comprising:
    detecting the presence of haze in an image by measuring the pixels' luminous level in the image;
    detecting that a background of the image has a narrow depth of field;
    extracting a foreground portion from the image if the image is detected having a narrow depth of field;
    extracting a background portion of the image;
    displaying the extracted foreground portion and the extracted background to a user with a value indicating depth of field of the foreground portion and a value indicating depth of field of the background portion; and
    performing image processing on the extracted foreground portion only leaving the background portion of the image unchanged, to further enhance the contrast between the extracted foreground portion and the extracted background portion.

2. The method of claim 1, wherein the step of detecting the presence of haze in an image is using a Fourier analysis of RGB channels of the image.

3. The method of claim 2, wherein the detection of the narrow depth of field background is achieved by referencing parameters of the image, wherein the parameters are aperture, zoom level, and shutter speed.

4. The method of claim 3, wherein the extraction of the foreground portion from the image is carried out via an edge map and an edge detection mechanism.

5. The method of claim 4, wherein the processing of the foreground portion is conducted via an image sharpening technique such that the haze of the foreground portion is removed and the background portion of the image unchanged.

6. A computer-implemented method for digital image de-hazing, the method comprising:
    detecting the presence of haze in an image;
    extracting at least one foreground object from the image;
    extracting a background portion of the image;
    displaying the at least one foreground object and the background portion to a user, each associated with a value indicating depth of field of the foreground object and a value indicating depth of field of the background portion;

receiving input from the user to vary the value indicating depth of field of the background portion; and performing image processing on the foreground object and the background object in view of the varied value indicating depth of field of the background portion, leaving the background portion of the image unchanged, to further enhance the contrast between the extracted foreground portion and the extracted background portion.

7. The method of claim 6, wherein a command is receivable by the user to increase the value indicating depth of field.

8. The method of claim 6, wherein a command is receivable by the user to decrease the value indicating depth of field.

9. The method of claim 6, wherein a second foreground object is extracted from the image, the object having a value indicating a different depth of field than the first foreground object.

10. A computer-implemented method for digital image de-hazing, the method comprising:

detecting the presence of haze in an image;

extracting a first foreground object from the image, the first foreground object being associated with a first value indicating depth of field of the first foreground object;

extracting a second foreground object from the image, the second foreground object associated with a second value indicating depth of field of the second foreground object;

extracting a background portion of the image;

displaying the first foreground object, the second foreground object, and the background portion, along with their respective depth of field values to a user;

receiving an input from the user to vary the value indicating depth of field of the background portion;

receiving another input from the user to vary a first value indicating another depth of field of the first foreground object leaving a depth of field of the second foreground object unchanged; and performing image processing on the foreground object for de-hazing and on the background object in view of the varied value indicating depth of field of the background portion, leaving the background portion of the image unchanged, to further enhance the contrast between the extracted foreground portion and the extracted background portion.

11. The method of claim 10, wherein further wherein another input is received by the user to vary the value indicating the depth of field of the second foreground object such that the depth of the field between the first foreground object and the second foreground object is variable.

12. The method of claim 11, wherein during image processing the depth of field of the second foreground object is changed in view of the varied value indicating the depth of field of the second foreground object.

\* \* \* \* \*